Dec. 28, 1965     E. FISCHER ET AL     3,226,444
PROCESS FOR THE MANUFACTURE OF PURE FORMALDEHYDE
Filed May 14, 1963
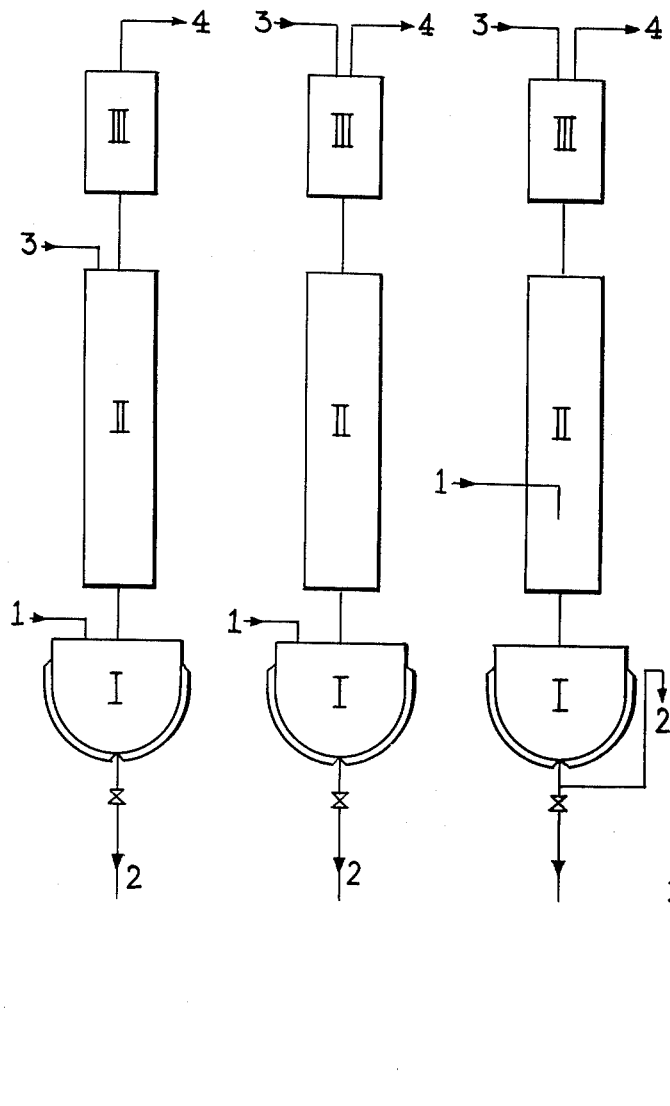
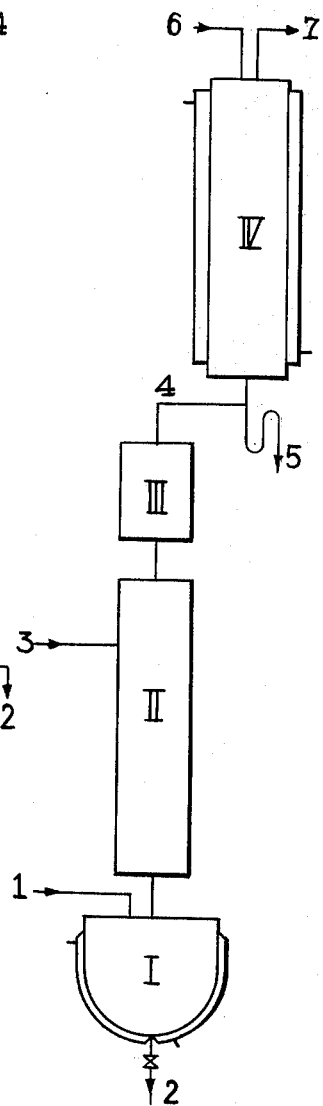
INVENTORS
*EDGAR FISCHER
HANS-DIETER HERMANN*
BY
*Curtis, Morris & Safford*
ATTORNEYS United States Patent Office
3,226,444
Patented Dec. 28, 1965

3,226,444
PROCESS FOR THE MANUFACTURE OF PURE FORMALDEHYDE
Edgar Fischer and Hans Dieter Hermann, Frankfurt am Main, Germany, assignors to Farbwerke Hoechst Aktiengesellschaft vormals Meister Lucius & Brüning, Frankfurt am Main, Germany, a corporation of Germany
Filed May 14, 1963, Ser. No. 280,313
Claims priority, application Germany, Dec. 19, 1958, F 27,317; Dec. 27, 1958, F 27,380
10 Claims. (Cl. 260—606)

The present application is a continuation-in-part application of our applications Serial No. 860,231 filed December 17, 1959 (now abandoned), and Serial No. 861,363 filed December 22, 1959 (now abandoned).

The present invention relates to a process for the manufacture of pure formaldehyde.

The formaldehyde produced by known processes contains, depending on the manufacturing conditions, varying amounts of water, methanol, and formic acid, the complete separation of which is very difficult and requires considerable expenditures for apparatus.

The manufacture of pure formaldehyde which is substantially free from the aforesaid compounds and other impurities is of great importance to the polymerization of formaldehyde, since impurities of the above kind considerably impair the polymerization of formaldehyde and the quality of the polymers obtained.

It is known that a substantially pure formaldehyde can be produced by thermal depolymerization of polymeric formaldehyde or by thermal decomposition of hemiformals, but in these processes the substantial separation of the alcohol component from the formaldehyde causes considerable difficulties. For example, after decomposition of the hemiformal formed between formaldehyde and cyclohexanol, it is not possible to separate the formaldehyde from the cyclohexanol by simple distillation. For a satisfactory separation of the two components, for example by partial condensation, additional condensation devices are required.

These special condensation devices have, however, the great disadvantage that continuous and careful control must be maintained since, in said devices, in addition to the desired separation of the alcohol component, there also takes place an undesired partial re-formation of hemiformal and a separation of polymeric formaldehyde. Thus the effectiveness of such special devices is necessarily impaired and losses of formaldehyde occur.

It has now been found that the difficulties in the manufacture of pure formaldehyde by thermal decomposition of hemiformals—especially those difficulties involved in the substantial separation of the alcohol component from the formaldehyde—can be avoided by carrying out the separation of the alcohol from the formaldehyde in the presence of at least one auxiliary liquid in a column provided with a reflux condenser. The auxiliary liquid must be in the upper part of the column and must possess, under the conditions prevailing in said upper part, a good dissolving power for the alcohol to be separated and, also, as low as possible a dissolving power for the monomeric formaldehyde. Furthermore, the auxiliary liquid should be inert towards formaldehyde.

As starting substances which split off formaldehyde there may be used hemiformals known per se, preferably those of high boiling mono- or polyhydric alcohols, for example acyclic alcohols such as n-pentanol, isopentanols, hexanols, octanols, butane-diol-1,4, and pentaerythritol, or cycloaliphatic alcohols such as cyclohexanol or methylcyclohexanols. These hemiformals are readily accessible by known processes and represent in most cases liquids which can be freed from the impurities impairing the polymerization. Particularly suitable are the hemiformals of alcohols which boil at atmospheric pressure at a temperature above 100° C. and which melt below 100° C.

The auxiliary liquids used in the process of the invention must comply with a number of requirements in order to exert their action to the desired extent. In addition to the aforementioned different solvent action for the alcohol to be separated and for the formaldehyde, the liquid auxiliary should not form an azeotropic mixture with the alcohol to be distilled off and it should have a lower boiling point than the alcohol to be separated. The greater the difference between the boiling points of auxiliary liquid and alcohol component the more favorable is the efficiency.

However, the auxiliary liquid used should also have as high a boiling point as possible so that practically no polymeric formaldehyde separates in the head of the column at the temperature prevalent there. When selecting the auxiliary liquid, care should be taken that the presence of the liquid in the monomeric formaldehyde recovered will not impair the quailty of polyformaldehyde produced therefrom. Above all, the auxiliary liquid should not contain impurities that would disturb such a polymerization. Detrimental impurities which might possibly be present should be removable to the degree necessary by relatively easy means, e.g. by distillation and treatment with an absorbing agent.

Suitable auxiliary liquids complying with these requirements are straight-chain and branched-chain aliphatic hydrocarbons, and cycloaliphatic hydrocarbons having possible alkyl substituents, having a boiling point in the range from about 80° C. to about 180° C., and, preferably, from about 80° C. to 140° C., such as n-heptane, n-octane, n-nonane, n-decane, the isomers thereof cyclohexane, lower alkylated cyclohexanes, for example methylcyclohexanes, ethylcyclohexanes, p-menthane, etc. Furthermore there may be used gasoline fractions which are readily accessible in the required purity or which can be freed from disturbing impurities by known methods. Mixtures of the aforesaid hydrocarbons may also be employed. In this case it is of advantage to combine hydrocarbons the boiling points of which are not too far from one another. The difference between the boiling points should not exceed about 10° C.

The auxiliary liquid at first brings about the separation of the alcohol and the formaldehyde by interposing itself in the column between the two substances to be separated. Then it drives the alcohol towards the lower end and the formaldehyde towards the upper end of the column. Simultaneously the auxiliary liquid refluxing in the column serves as a countercurrent wash for the ascending alcohol vapors. This process can be considerably intensified by charging the column with auxiliary liquid in addition to that normally refluxing. Also using this method, it is possible to keep the column temperature so high that no polymerization of the formaldehyde and no disturbing re-formation of the hemiformal take place.

The amount of auxiliary liquid required largely depends on the efficiency and on the capacity of the column used. When very effective columns are employed, amounts of less than 30% by weight, for example 28% by weight, of auxiliary liquid, calculated on the formal used, are sufficient.

The process of the present invention can be carried out discontinuously or continuously.

The accompanying FIGURES 1 to 3 diagrammatically represent three variants of an apparatus suitable for carrying out the process of the invention. FIG. 1 shows column II, provided with about 80 theoretical plates, mounted on distilling vessel I. Reflux condenser III, fed with water at a temperature of about 10° C., is positioned at the head of column II. When operating discontinuously, the hemiformal starting material is introduced into vessel I through inlet 1 with the exclusion of oxygen, and is heated to the required decomposition temperature. To separate the ascending vapors of alcohol and formaldehyde, auxiliary liquid is simultaneously and continuously introduced into column II through inlet 3 in such an amount that no alcohol escapes at the head of the column. When the hemiformal has been decomposed, alcohol formed in the decomposition can be removed from distilling vessel I through outlet 2, together with part of the auxiliary liquid. Formaldehyde set free in the course of the decomposition escapes at outlet 4.

The discontinuous process described above can be modified, using the apparatus shown in FIG. 2, such that the auxiliary liquid is not added at the head of column II, but at the upper end of reflux condenser III through inlet 3 of FIG. 2. In this variant of the process the reflux condenser III is, so to speak, the upper part of column II and it is, therefore, suitably provided with filling bodies generally used in columns. The addition of the auxiliary liquid at the upper end of the reflux condenser III represents a preferred embodiment of the process of the invention.

The process of the invention can also be carried out continuously in the apparatus diagrammatically shown in FIGURE 2. After the completion of the decomposition of a discontinuous batch, hemiformal is, however, continuously introduced. As shown in FIG. 3, the hemiformal is preferably introduced into the lower third of column II through inlet 1, and the alcohol formed in the decomposition is continuously removed together with the auxiliary liquid from the distilling vessel through outlet 2 of FIG. 3. Simultaneously with the addition of hemiformal, auxiliary liquid is continuously supplied through inlet 3 of FIG. 3, and the formaldehyde formed in the decomposition escapes continuously through outlet 4.

In most cases the method of purification as described above is absolutely sufficient for obtaining a formaldehyde suitable for polymerization. Sometimes, however, the proportion of impurities contained in the formaldehyde after the contact with the auxiliary liquid is still too high. This may be the case when the vapor pressure of the alcohol set free from the hemiformal and/or the vapor pressure of the auxiliary liquid used are relatively high. The formaldehyde may then contain small amounts of vaporous auxiliary liquid and eventually vaporous alcohol. If these impurities, and especially the last traces of the auxiliary liquid, shall be removed it is recommend to apply the following method of purification:

After the thermal decomposition of the hemiformal the ascending vapors of the mixture of formaldehyde and alcohol successively conducted through two columns interconnected by means of a condenser and contacted in the first column with an auxiliary liquid above mentioned having a boiling point lower than the alcohol to be separated and in the second column with an auxiliary liquid the boiling point of which is above that of the alcohol to be separated.

In the second column, in which a temperature in the range from about 80 and about 200° C. and preferably between about 100 and about 150° C. prevails, an auxiliary liquid is used which is likewise inert towards formaldehyde and has the same properties as the auxiliary liquids in the first column with respect to formaldehyde as defined above. Suitable are hydrocarbons and hydrocarbon mixtures, particularly straight-chain and branched-chain paraffin hydrocarbons having 11 to 30 carbon atoms and a boiling range of about 180° C. to about 350° C. and preferably about 200 to about 300° C., such as undecane, dodecane, hexadecane, tricosane, triacontane and mixtures thereof. The auxiliary liquid which is discharged from the column and serves for washing the formaldehyde can be regenerated in simple manner, for example by release distillation, whereby practically no losses occur.

The accompanying FIGURE 4 diagrammatically represents a device suitable for carrying out this variant of the process. Column II having, for example, 5 theoretical plates is mounted on vessel I and provided at the upper end with reflux condenser III fed with water having a temperature of about +10° C. The vapors escaping from the condenser at 4 are conducted from below into washing column IV provided with a heating jacket in a countercurrent with the washing liquid supplied at 6, and are discharged at 7. The washing column is filled with Raschig ring bodies of wire net. The washing liquid leaves the device at 5 by way of a separator.

The process of this variant can also be carried out in said device either discontinuously or continuously.

When operating in discontinuous manner the formal is introduced into the vessel I and heated to the decomposition temperature. At 3, approximately at the height of the third plate, the column is charged with a gasoline fraction having a boiling range of 115 to 130° C., for example octane, in an amount such that its share of the operating load of column II amounts to about 40–70%. It is likewise possible to charge the distilling vessel I simultaneously with the hemiformal and the auxiliary liquid.

In the course of the operation a depletion of said auxiliary liquid (head liquid) takes place in the column, since a certain amount thereof, corresponding to its respective partial pressure, is entrained with the formaldehyde vapors. The losses thus arising must be supplemented in the course of the operation by a corresponding addition of auxiliary liquid. The amount required for this purpose largely depends on the load of the column and the efficiency of the reflux condenser.

The vapors leaving condenser III at 4 are washed in a countercurrent in column IV which is charged with an amount of higher boiling auxiliary liquid such that no alcohol escapes at the head of the column at 7.

For operating continuously the process is carried out in an analogous manner. The hemiformal is continuously introduced at 3 in the main column and by a continuous discharge at 2 the level of the liquid is kept constant in the vessel. It is likewise possible to introduce the hemiformal at 1 continuously into the vessel but the first described working method is to be preferred. The development of formaldehyde can be controlled in the discontinuous working method by the heat supply of the vessel and in the continuous working method also by the addition of hemiformal.

The washing column IV can be operated at normal temperature but it is more favorable to maintain a working temperature of about 80 to 160° C. and preferably 100 to 130° C. to ensure that no polymer is formed.

By the use of a liquid having a boiling point which is below that of the alcohol to be separated, the present process permits a simple washing out of the said alcohol of the gaseous formaldehyde in the first column while a relatively small column having, for example, 5 plates and relatively small amount of the used auxiliary liquid are sufficient. Since in the course of the operation of the device the liquid having a boiling point below that of the alcohol to be separated mainly concentrates in the first column, said alcohol need not be separated from the auxiliary liquid by distillation but can be used without further treatment for the manufacture of new amounts of hemiformals. Moreover, in the present process the temperature in the column can be kept so high that no polymerization of the formaldehyde takes place and no disturbing re-formation of the hemiformal occurs.

In the second washing column the residual impurities are washed out of the formaldehyde by the higher boiling auxiliary liquid so that always a formaldehyde is obtained having a degree of purity of at least 99.9%.

The pure formaldehyde produced by the process of the invention can be used for the manufacture of formaldehyde polymers having valuable properties.

The following examples serve to illustrate the invention but they are not intended to limit it thereto, the parts and percentages being by weight unless otherwise stated.

Example 1

1,000 parts of cyclohexyl hemiformal consisting of 0.013% of water
0.01% of methanol
0.01% of formic acid
22.4% of formaldehyde
Balance—cyclohexanol were introduced, with the exclusion of oxygen, into distilling column I of the apparatus shown in FIGURE 2 after the apparatus had been heated under reduced pressure and scavenged with dry nitrogen so as to remove traces of water. On further heating, a vigorous separation of formaldehyde took place at a temperature from about 130° C. onwards. Octane purified by distillation and filtration over highly active silica gel was introduced into the column through inlet 3 of FIG. 2 in an amount such that in the reflux of the condenser III practically no cyclohexanol was present. Until the end of the formaldehyde development about 280 parts of octane were required.

The about 200 parts of formaldehyde escaping at outlet 4 of FIG. 2 contained the following impurities:

$H_2O$—less than 100 parts per million
Methanol—less than 100 parts per million
Cyclohexanol—less than 20 parts per million When the reaction was complete, the content of formaldehyde in the distilling vessel was reduced to 0.19%, calculated on the cyclohexanol in the vessel. In the column II no formation of formaldehyde polymer occurred.

Example 2

The distilling vessel of an apparatus as shown in FIG. 1 and cleaned as described in Example 1 was charged with 500 parts of a gasoline fraction having a boiling point of 130–135° C. under 760 mm. of mercury and purified by distillation and filtration over highly active silica gel. The fraction was heated to boiling. When a stationary state eixsted in the column, 1,000 parts of methylcyclohexyl hemiformal produced from the industrial mixture of the three isomeric methylcyclohexanols were introduced through inlet 1 (cf. FIGURE 1) into the distilling vessel so slowly that the column could simultaneously be charged through inlet 3 with 50%, calculated on the hemiformal supplied, of the same gasoline fraction as was fed into the distilling vessel, without obstructions occurring in the column. The monomeric formaldehyde escaping through outlet 4 contained less than 60 parts per million of methylcyclohexanol.

Example 3

The distilling vessel of an apparatus as shown in FIGURE 3 which had been cleaned as described in Example 1 was charged with 500 parts of purified n-octane which was heated to boiling. As soon as a stationary state prevailed in column II, 10 parts of cyclohexyl hemiformal and 3.5 parts of n-octane were simultaneously introduced in the apparatus of FIG. 3 inlet 3 respectively. The formaldehyde escaping through outlet 4 contained 40–60 parts per million of cyclohexanol.

Example 4

1,000 parts of cyclohexyl hemiformal consisting of 0.013% of water
0.01% of methanol
0.01% of formic acid
22.4% of formaldehyde
Balance—cyclohexanol were introduced with the exclusion of oxygen into vessel I of the device demonstrated in FIGURE 4 after the latter had been heated under reduced pressure and scavenged with dry nitrogen so as to remove traces of water. Then about 150 parts of n-octane purified by distillation and filtration over highly active silica gel were added and the heating was switched on. At a vessel temperature of about 130° C. a vivid separation of formaldehyde took place. As washing liquid for column IV a gasoline fraction was used having a boiling range from 280 to 300° C. which had been pretreated in the same manner as the octane. The column IV was kept at an operating temperature of 120 to 125° C. For washing the 200 parts of monomeric formaldehyde 300 parts of the gasoline fraction were used. The quantitative analysis revealed that the formaldehyde thus purified only contained immaterial traces of compounds impairing the polymerization, namely:

$H_2O$—less than 100 parts per million
$CH_3OH$—less than 100 parts per million
Cyclohexanol—less than 40 parts per million.

Example 5

The vessel I of the device which had been cleaned as described in Example 4 was charged with 500 parts of a gasoline fraction having a boiling range from 130 to 135° C. under 760 mm. of mercury, purified by distillation and filtration over highly active silica gel, and the fraction was heated to the boil. When a stationary state had adjusted in column II there were continuously added at 3 10 parts of cyclohexyl hemiformal and at 6 simultaneously 3.5 parts of a gasoline fraction having a boiling range of 220 to 230° C. The temperature of the washing column IV was maintained at 100 to 105° C. The formaldehyde escaping at 7 had a content of cyclohexanol less than 60 parts per million.

We claim:

1. In the process for manufacturing formaldehyde by thermally decomposing a hemi-formal of formaldehyde and an alcohol melting below 100° C. and boiling above 100° C. and recovering gaseous formaldehyde from the vapor mixture resulting from said decomposition, the improvement which comprises contacting said vapor mixture, prior to recovering formaldehyde therefrom, with an auxiliary liquid conducted in countercurrent flow to said vapor mixture, said liquid being a hydrocarbon having a boiling point lower than the boiling point of the alcohol freed by decomposition of said hemi-formal and between about 80° C. and about 180° C., forming no azoetrope with said alcohol, and being selected from the group consisting essentially of aliphatic hydrocarbons, cycloaliphatic hydrocarbons, and alkyl substituted cycloaliphatic hydrocarbons, whereby the alcohol and the other by-products are removed from said vapor mixture, and highly pure formaldehyde remains.

2. A process as in claim 1, wherein said auxiliary liquid has been purified by distillation and treatment with an absorption agent.

3. A process as in claim 1, wherein said auxiliary liquid is a mixture of components the boiling points of which differ by at most 10° C.

4. A process as in claim 1, wherein said auxiliary liquid is a gasoline fraction.

5. A process as in claim 1, wherein said hemi-formal is cyclohexyl hemi-formal and said auxiliary liquid is n-octane.

6. A process as in claim 1, wherein the hemi-formal is continuously introduced directly into evaporating, still boiling, auxiliary liquid.

7. In the process for manufacturing formaldehyde by thermally decomposing a hemi-formal of formaldehyde and an alcohol melting below 100° C. and boiling above 100° C. and recovering gaseous formaldehyde from the vapor mixture resulting from said decomposition, the improvement which comprises (1) contacting said vapor mixture, prior to recovering formaldehyde therefrom, with a first auxiliary liquid conducted in countercurrent flow to said vapor mixture, said liquid being a hydrocarbon having a boiling point lower than the boiling point of the alcohol freed by decomposition of said hemi-formal and between about 80° C. and about 180° C., forming no azeotrope with said alcohol, and being selected from the group consisting essentially of aliphatic hydrocarbons, cycloaliphatic hydrocarbons, and alkyl substituted cycloaliphatic hydrocarbons, whereby the alcohol and the other by-products are removed from said vapor mixture, and (2) subsequently washing the vapor mixture consisting essentially of pure formaldehyde and a small amount of said first auxiliary liquid with a second auxiliary liquid conducted in countercurrent flow to said vapor mixture, said second liquid being a hydrocarbon having a boiling point higher than the boiling point of the alcohol of said hemi-formal and between about 180° C. and about 350° C. and forming no azeotrope with said alcohol, whereby highly pure formaldehyde remains.

8. A process as in claim 7 wherein the hydrocarbon boiling between about 180° C. and about 350° C. is a paraffinic hydrocarbon having 11 to 30 carbon atoms.

9. A process as claimed in claim 7, wherein the second auxiliary liquid used has a boiling point in the range from about 200 to 300° C.

10. A process as in claim 7 wherein said hemi-formal is cyclohexyl hemi-formal, said first auxiliary liquid is a gasoline fraction having a boiling range of 115° to 130° C., and said second auxiliary liquid is a gasoline fraction having a boiling range of 280° to 300° C.

References Cited by the Examiner
UNITED STATES PATENTS

| | | | |
|---|---|---|---|
| 2,305,038 | 12/1942 | Schumacher. | |
| 2,591,672 | 4/1952 | Catterall | 202—39.5 |
| 2,635,992 | 4/1953 | Carlson et al. | 202—39.5 |
| 2,710,829 | 6/1955 | Michael | 202—39.5 |
| 2,791,550 | 5/1957 | West et al. | 202—39.5 |
| 2,848,500 | 8/1958 | Funck | 260—606 |

NORMAN YUDKOFF, *Primary Examiner.*